United States Patent
Krause

(10) Patent No.: US 6,241,225 B1
(45) Date of Patent: Jun. 5, 2001

(54) RUBBER BEARING FOR THE BEARING SUPPORT OF A STABILIZER IN A MOTOR VEHICLE

(75) Inventor: Wolfram Krause, Swisttal (DE)

(73) Assignee: Mannesmann Boge GmbH, Bonn (DE)

( * ) Notice: Subject to any disclaimer, the term of this patent is extended or adjusted under 35 U.S.C. 154(b) by 0 days.

(21) Appl. No.: 09/038,525

(22) Filed: Mar. 11, 1998

(30) Foreign Application Priority Data

Mar. 11, 1997 (DE) .............................................. 197 09 669

(51) Int. Cl.$^7$ ............................... B60G 11/22; F16F 1/36
(52) U.S. Cl. .................................... 267/292; 403/222
(58) Field of Search .................................. 267/292, 293, 267/294, 153, 183, 141, 141.1, 141.4; 384/220, 297, 222, 97; 403/222, 223

(56) References Cited

U.S. PATENT DOCUMENTS

| | | | |
|---|---|---|---|
| 3,559,979 | * | 2/1971 | Muller .......................................... 267/1 |
| 5,013,166 | * | 5/1991 | Domer ........................................ 384/220 |
| 5,080,334 | * | 1/1992 | Mihara et al. ............................ 267/141.1 |
| 5,261,748 | * | 11/1993 | Kameda ..................................... 384/222 |
| 5,437,439 | * | 8/1995 | Brokamp et al. ......................... 267/293 |
| 5,520,465 | * | 5/1996 | Kammel ..................................... 384/220 |

FOREIGN PATENT DOCUMENTS

| | | | |
|---|---|---|---|
| 89 01 525 | 2/1989 | (DE) | ............................... F16F/1/38 |
| 39 03 350 | 8/1990 | (DE) | ............................... F16F/1/38 |
| 42 04 252 | 8/1993 | (DE) | ............................ B60G/21/055 |
| 43 09 425 | 6/1994 | (DE) | ............................. B60G/11/10 |
| 44 13 666 | 6/1995 | (DE) | ............................. B60G/21/04 |

* cited by examiner

Primary Examiner—Robert J. Oberleitner
Assistant Examiner—Pamela J. Rodriguez
(74) Attorney, Agent, or Firm—Cohen, Pontani, Lieberman & Pavane

(57) ABSTRACT

A rubber bearing, especially for the bearing support of a stabilizer bar in a motor vehicle, comprises two rubber half-shells. A thin rubber connecting piece connects the longitudinal side of one of the half-shells with the longitudinal side of the other one of the half-shells. The rubber connecting piece is arranged at the radial outer region of the half-shells to enable 180° of rotation of one of the half-shells with respect to the other one of the half-shells about the area of connection.

3 Claims, 2 Drawing Sheets

RUBBER BEARING FOR THE BEARING SUPPORT OF A STABILIZER IN A MOTOR VEHICLE

BACKGROUND OF THE INVENTION

1. Field of the Invention

The invention is directed to a rubber bearing, particularly for the bearing support of a stabilizer bar in a motor vehicle, comprising two rubber half-shells. A side of one of the half-shells is connected with a side of the other one of the half-shells with a thin rubber connecting piece.

2. Description of the Related Art

Prior art rubber-metal bushings of the above-mentioned type are already known (see, for example, German reference DE-PS 39 03 350), wherein two outer bearing half-shells are clamped together to form a receptacle lug. These outer bearing half-shells receive two rubber-metal half-shells. For this purpose, a rubber layer is provided at the radial inner metal reinforcement, this rubber layer extending continuously from one metal half-shell to the other metal half-shell so that the two rubber-metal half-shells hold together and form a rubber film hinge at the continuous thin rubber layer. The two rubber-metal half-shells are foldable about this rubber film hinge to facilitate assembly. This prior art design is disadvantageous in that folding can only take place within a restricted angular area, namely in the area in which the outer bearing half-shells abut at one another.

SUMMARY OF THE INVENTION

It is the object of the invention to provide a rubber bearing which is not only easy to assemble, but can also be manufactured simply and economically.

To meet this object, a rubber connecting piece for connecting the two half-shells is arranged at the radially outermost region of the half-shells.

In one preferred embodiment, the rubber connecting piece has a length dimension that allows one half-shell to be rotated by approximately 180° relative to the other half-shell. Because one of the two half-shells is rotatable by approximately 180° relative to the other, it is possible to manufacture both half-shells with identical shapes. During manufacturing, each half-shell is located in a cavity of a die so that a hinge (i.e., rubber connecting piece) is formed by a corresponding rubber overrun or flash, wherein the hinge is designed to be completely flexible and is made from rubber.

According to another embodiment form, the rubber piece is arranged over approximately the entire axial length of the rubber bearing. Advantageously, a hinge of appropriate durability is provided by the rubber piece, which hinge is needed only for assembly, after which this rubber connecting piece no longer has any particular function.

According to another embodiment, at least one half-shell includes at least one reinforcement. In this embodiment, the reinforcement is a metal element is advantageously provided with at least one opening for an improved connection with the rubber half-shell.

To facilitate assembly and a defect-free fixing of the rubber bearing in its operable position, at least one of the half-shells is comprises at least one flange for positioning the rubber bearing and to absorb axial forces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
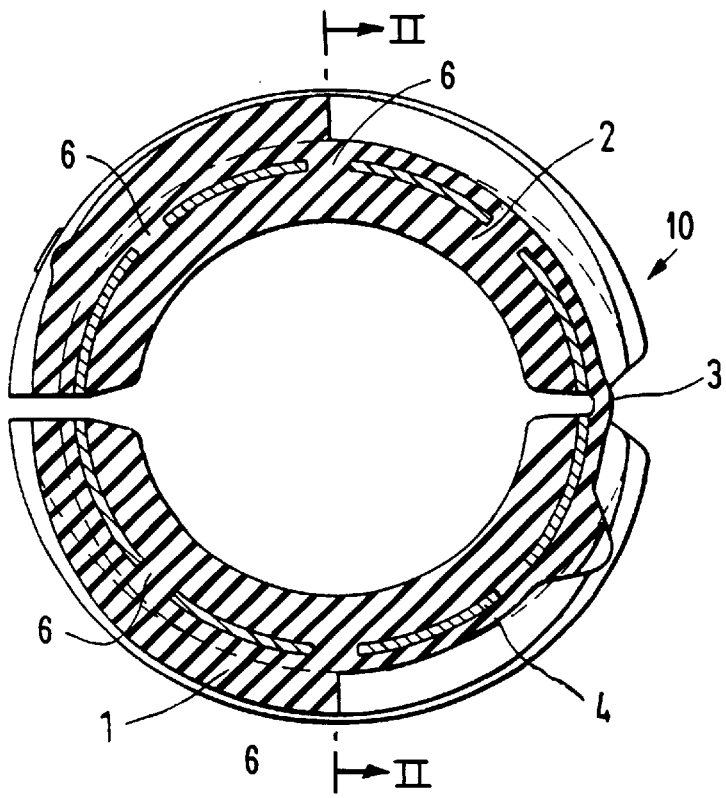
FIG. 1 is a side view of a rubber bearing according to the invention in its operable position.
Figure 2:
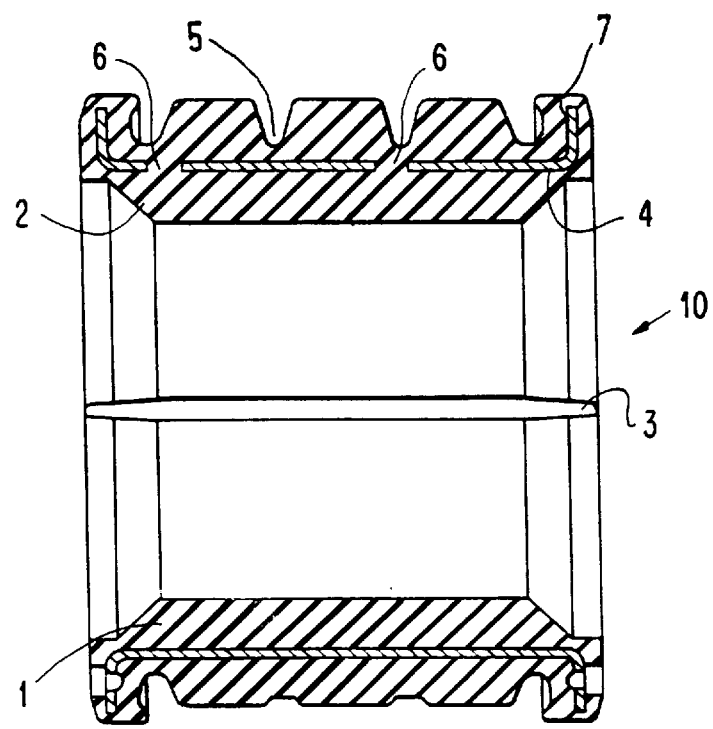
FIG. 2 is a sectional view of the rubber bearing along the line II—II shown in FIG. 1.

Referring initially to FIGS. 1 and 2, a rubber bearing 10, in accordance with the invention, comprises a first rubber half-shell 1 and a second rubber half-shell 2. The first and second rubber half-shells 1, 2 are nondetachably connected by a rubber connecting piece 3. A simple assembly of the rubber bearing is effected by folding one of the first and second rubber half-shells 1, 2 relative to the other of the first and second rubber half-shells, in addition to a corresponding positioning of the first and second rubber half-shells 1 and 2 relative to one another during assembly.

FIGS. 1 and 2 also show a reinforcement 4 including openings 6 which serve for pressure compensation between the inner and outer layers of the first and second rubber half-shells 1 and 2, respectively, during a vulcanization process that is used to produce the first and second rubber half-shells 1, 2.

Figure 3:
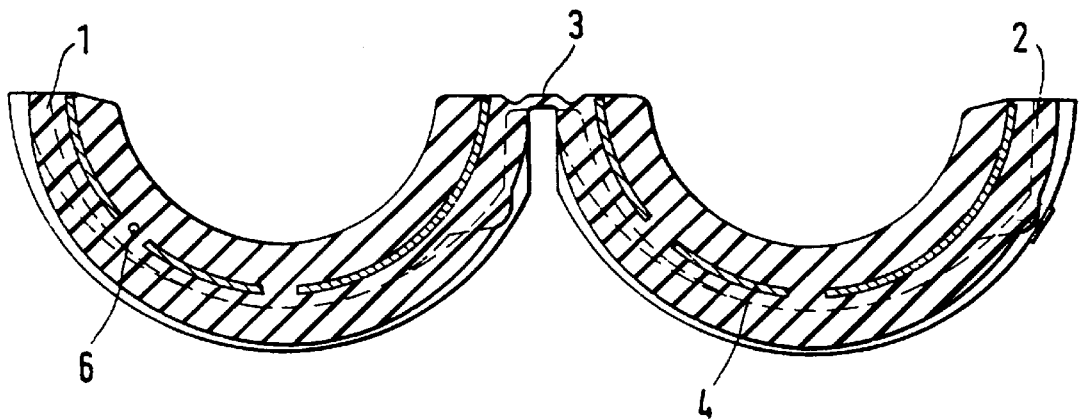
FIG. 3 is a side view of the rubber bearing of FIG. 1 with one of the half-shells rotated 180° with respect to the other one of the half-shells.

The rubber connecting piece 3 has a corresponding extension, which enables the rotation of the two rubber half-shells 1 and 2 relative to one another by approximately 180°. Favorable manufacturing of the rubber bearing 10 is ensured in that the first and second rubber half-shells 1 and 2 are produced in a relatively flat die so as to lie horizontally. The die is constructed in such a way that the rubber connecting piece 3 extends from the first half-shell 1 to the second half-shell 2 to fix the two parts relative to one another. FIG. 3 shows that the reinforcement parts 4 are insertable into a die horizontally, whereupon the rubber can be introduced and vulcanized.

FIG. 2 shows recesses 5 which serve for volume compensation of the rubber half-shells 1 and 2. This volume compensation is necessary when a pretensioning is applied to the rubber bearing during or after assembly, such that a determined displaced volume of a rubber half-shell 1 or 2 is displaced into the recess 5.

FIG. 2 also shows a flange 7 which is reinforced by the reinforcement part 4. The flange aids in positioning the rubber bearing 10 in its operable position and absorbs axial forces exerted on the rubber bearing 10.

Figure 4:
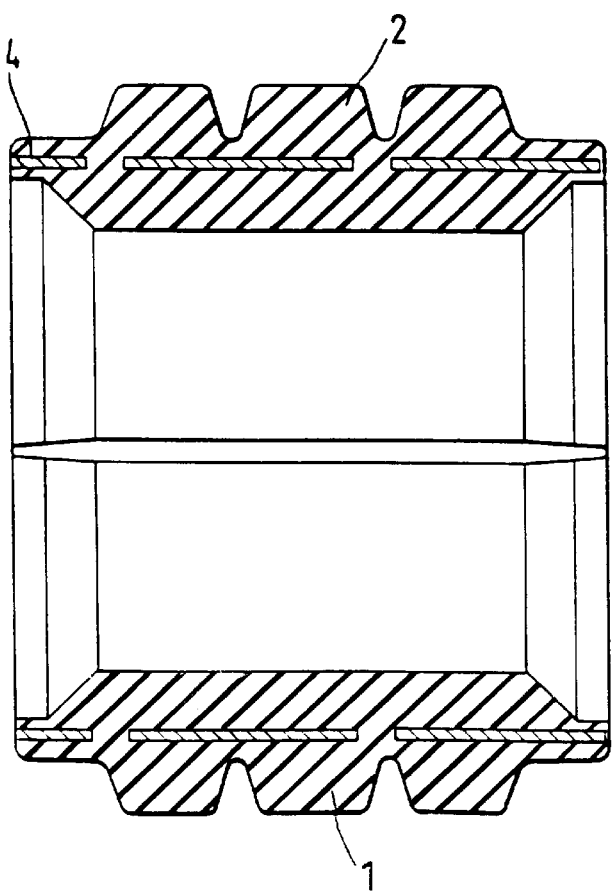
FIG. 4 is a sectional view of another embodiment of the present invention which does not have flanges.

FIG. 4 shows another embodiment of the rubber bearing 10' in which the first and second rubber half-shells 1 and 2 have a cylindrical reinforcement 4, but do not include a flange 7 as shown in FIG. 2.

The invention is not limited by the embodiments described above which are presented as examples only but can be modified in various ways within the scope of protection defined by the appended patent claims.

I claim:

1. A rubber bearing for supporting a stabilizer bar in a motor vehicle, comprising:

a first rubber half-shell and a second rubber half-shell;

a rubber connecting piece hingably connecting a longitudinal side of said first half-shell to a longitudinal side of said second half-shell, said rubber connecting piece being connected on said first and second half shells over substantially an entire axial length of said rubber bearing, wherein said first and second half-shells are connected only on one longitudinal side such that said first half-shell is rotatable by approximately 180° relative to said second half-shell;

wherein the rubber connecting piece is arranged at a radially outer region of each of said first and second half-shells; and a reinforcement arranged in at least one of the first half-shell and the second half-shell defining a radial inner layer and a radial outer layer, wherein said reinforcement comprises at least one opening operatively arranged for effecting a pressure compensation between said radial inner layer and said radial outer layer.

2. The rubber bearing of claim 1, wherein said reinforcement comprises a metal element.

3. The rubber bearing of claim 1, further comprising a flange operatively mounted on at least one of said first half-shell and said second half-shell for positioning said rubber bearing and absorbing axial forces exerted on said rubber bearing.

* * * * *